United States Patent [19]

Raineri

[11] 4,212,144
[45] Jul. 15, 1980

[54] MACHINE FOR CUTTING AND CONDITIONING FORAGE

[75] Inventor: Giuseppe Raineri, Bassano del Grappa, Italy

[73] Assignee: Pietro Laverda S.P.A., Breganze, Italy

[21] Appl. No.: 15,691

[22] Filed: Feb. 27, 1979

[30] Foreign Application Priority Data

Mar. 7, 1978 [IT] Italy ............................ 67480 A/78

[51] Int. Cl.² ............................................ A01D 35/12
[52] U.S. Cl. ...................................... 56/15.8; 56/208; 56/DIG. 1
[58] Field of Search ................. 56/DIG. 1, 14.3, 15.9, 56/15.8, 14.9, 208

[56] References Cited

U.S. PATENT DOCUMENTS

| | | | |
|---|---|---|---|
| 3,266,230 | 8/1966 | Rowbotham | 56/208 |
| 3,479,805 | 11/1969 | Soteropulos | 56/DIG. 1 |
| 3,699,754 | 10/1972 | Koch et al. | 56/15.8 |
| 3,808,781 | 5/1974 | Bass et al. | 56/15.9 |
| 3,958,399 | 5/1956 | Schoeneberger | 56/208 |
| 3,995,411 | 12/1976 | Johnson | 56/15.8 |

Primary Examiner—Louis G. Mancene
Assistant Examiner—Paul J. Hirsch
Attorney, Agent, or Firm—Sughrue, Rothwell, Mion, Zinn and Macpeak

[57] ABSTRACT

A machine for cutting and conditioning forage comprises a main frame having, pivotally connected thereto, a cutter platform carrying a cutter bar and two counter-rotating transverse rolls for crushing the forage cut by the cutter bar; the cutter platform is attached at each side to the main frame by an upper side arm and a lower side arm the latter being a hydraulic actuator, the arrangement being such that when the hydraulic actuators are extended from the fully retracted position the upper side arms first turn about their pivots, allowing preliminary forward movement of the cutter platform with respect to the main frame, before they meet respective abutments which prevent further movement, whereupon the cutter platform turns about the pivots fixing it to the upper side arms and is raised from the ground.

7 Claims, 4 Drawing Figures

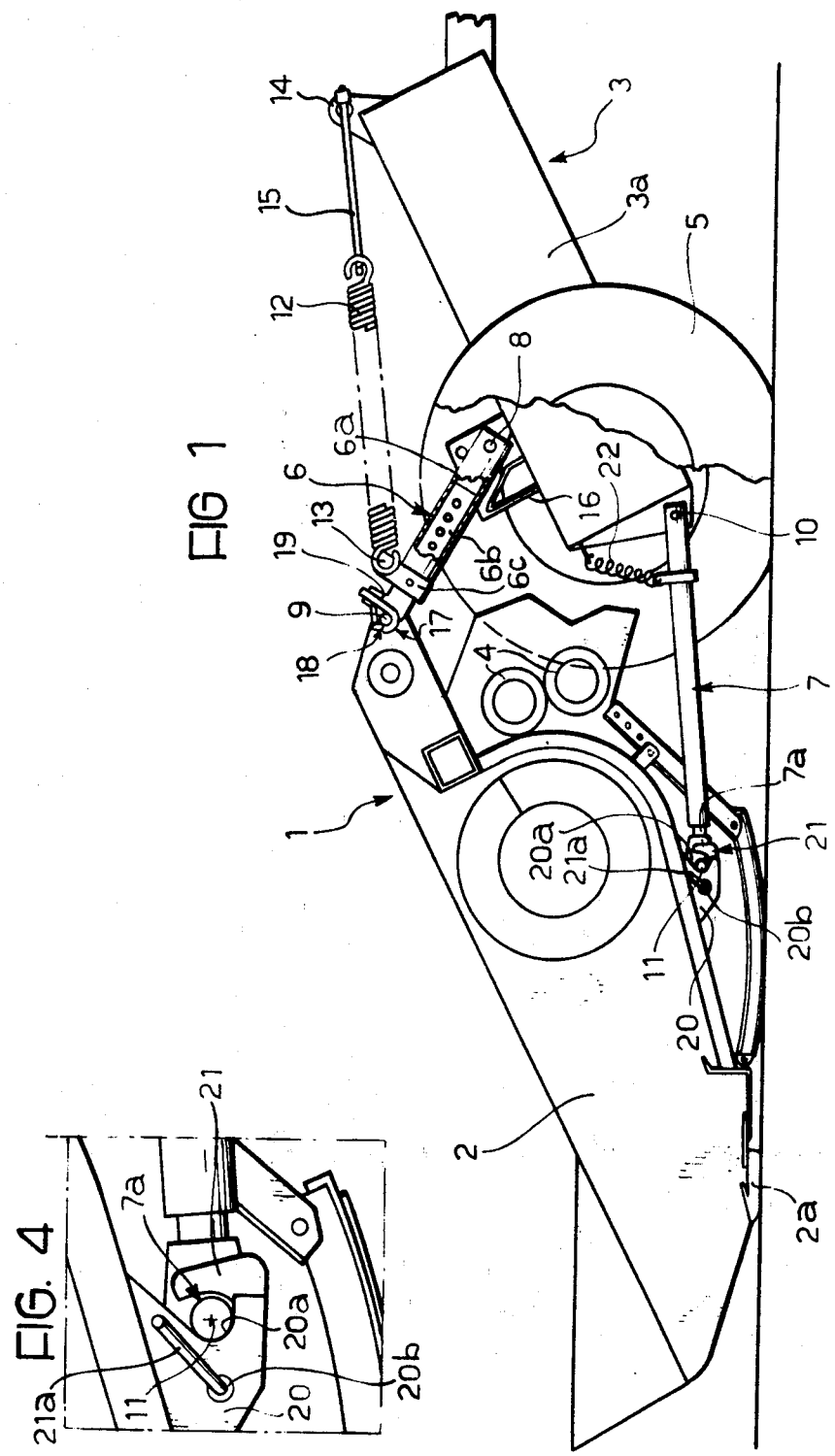

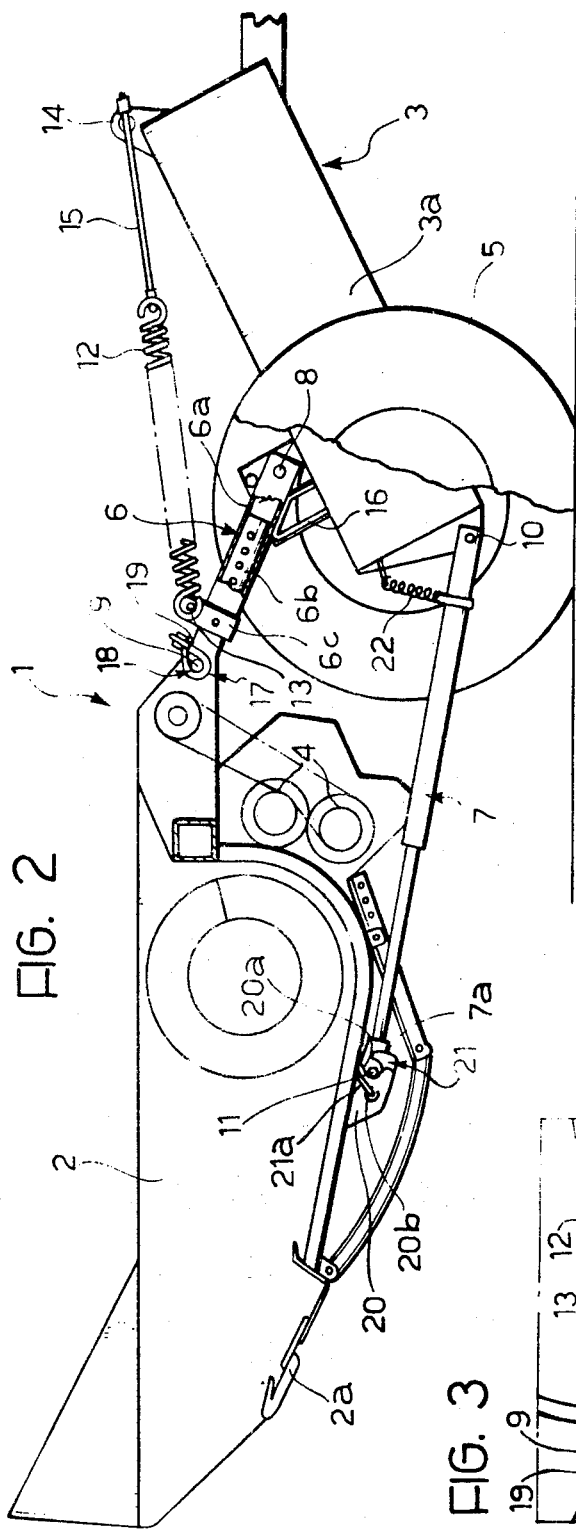
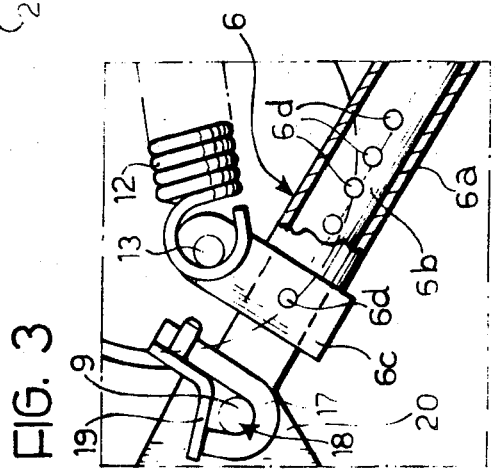

MACHINE FOR CUTTING AND CONDITIONING FORAGE

BACKGROUND OF THE INVENTION

The present invention relates to a machine for cutting forage and having means for conditioning forage harvested by the machine. The term "conditioning" is used in the agricultural field to indicate an operation by means of which the process of drying the forage in the field is both accelerated and made more uniform. This operation consists in crushing and bending the stalks and the coarser parts of the forage which tend to take longer to dry than the leaves.

In particular, the present invention relates to a machine of the type including a frame, a cutter platform provided with a cutter bar and a pair of counter-rotating transverse rolls for conditioning the cut product by crushing it between them. The cutter platform is carried on two pairs of side arms, which connect the cutter platform to the main frame of the machine. Each pair of side arms comprises an upper arm and a lower arm, the arms all being pivoted at one end to the cutter platform and at the other end to the main frame of the machine.

In machines of this type it is very important, in order that the conditioning can be effected efficiently, for the transverse dimension of the conditioner rolls to be as close as possible to that of the cutter bar; since the rolls must be behind the cutter bar their transverse dimension is limited by the width of the frame of the machine, particularly that part of the machine which carries the front wheels. Thus although the length of the conditioner rolls should be as long as possible this requirement is limited by the fact that the position of the rolls places constraints on the greatest length which can be accommodated, particularly since in operation of the machine it is necessary to be able to raise and lower the cutter platform on which the conditioner rolls are carried and during the movement of the cutter platform it is essential that the conditioner rolls do not foul against the frame of the machine and in particular with the parts of the frame which carry the front wheels.

OBJECTS OF THE INVENTION

The primary object of the present invention is to provide a machine for cutting and conditioning forage having a system for mounting the cutter platform on the frame of the machine, which system includes movable parts by means of which the cutter platform can be raised or lowered through the required working range, but which allows the length of the conditioner rolls to be greater, for a given wheel track and therefore cutter bar length, than has hithertofore been possible with machines of this type.

Another object of the invention is to provide a cutter platform mounting system for a machine for cutting and conditioning forage, which permits simple and rapid coupling and uncoupling of the cutter platform to and from the main frame of the machine.

A further object of the invention is to provide a simple and robust cutter platform mounting system which can be adjusted to work in different operating conditions.

SUMMARY OF THE INVENTION

With a view to achieving the above mentioned objects the present invention accordingly provides a machine for cutting and conditioning forage, of the type including a frame, a cutter platform, a cutter bar mounted on said cutter platform, a pair of counter rotating transverse rolls on said cutter platform for conditioning the forage cut by said cutter bar, two pairs of side arms connecting said cutter platform to said frame of said machine, each said pair of side arms comprising an upper side arm and a lower side arm, means pivoting each said side arm at one end thereof to said other platform and at the other end thereof to said frame of said machine, the improvement wherein said upper side arms extend forwardly and upwardly from said pivot connecting them to said frame of said machine, said lower side arms each consist of a hydraulic actuator extension and retraction of which controls the raising and lowering of said cutter platform respectively, respective resilient biasing means are located above each said upper side arm, said resilient biasing means interconnecting the frame of said machine said two upper side arms and abutment elements are located on the frame of said machine in positions such that said upper side arms are spaced therefrom when said hydraulic actuators are in a fully retracted position and said upper side arms turn downwardly about the pivots connecting them to the frame of said machine until they engage against said abutment elements when said double acting hydraulic actuators are caused to extend from said fully retracted position, whereby said cutter platform is displaced forwardly from its lowered position prior to being raised from the ground upon extension of said hydraulic actuators.

In the novel system, therefore, when the hydraulic actuators are controlled to extend in order to cause the raising of the cutter platform, the upper side arms first turn downwardly about their pivot points on the frame of the machine upon initial extension of the actuators, this continuing until the upper side arms stop against the abutment elements. When this occurs the upper side arms remain fixed so that further extension of the hydraulic actuators causes the cutter platform to turn about the pivot axis between itself and the upper side arms. Thus, from its fully lowered position, when the cutter platform is controlled to rise, it is subjected first to a forward displacement, with respect to the frame of the machine, for a certain distance due to the above mentioned downward rotation of the upper side arms, before rising by rotation about the pivots at the upper ends of the upper side arms. This forward movement of the cutter platform and the consequent forward displacement of the conditioner rolls carried thereby, with respect to the frame of the machine during elevation of the cutter platform permits use, for a given value of the front wheel track of the machine, of conditioner rolls of a significantly greater length than would have previously been possible in known machines of this type since the rolls are carried forward from their lowered working position to an advanced position where they will not foul against the frame of the machine as the cutter platform is raised.

Other characteristics and advantages of the invention will become apparent from reading the following description, in which reference is made to the accompanying drawings, provided purely by way of non-limitative example.

BRIEF DESCRIPTION OF THE DRAWINGS

FIG. 1 is a schematic side view of the front part of a machine for cutting and conditioning forage according to the present invention, showing the machine in a first operating position;

FIG. 2 is a side view of the machine of FIG. 1 showing the machine in a second operating position; and FIGS. 3 and 4 are diagrams illustrating, on an enlarged scale, two details of FIGS. 1 and 2.

DESCRIPTION OF THE PREFERRED EMBODIMENT

In the drawings there is shown a cutter platform, generally indicated 2, mounted on a frame 3 of a machine for cutting and conditioning forage. The cutter platform 2 is provided with a cutter bar 2a and supports for rotation two counter rotating transverse rolls 4 which operate to condition the forage cut by the cutter bar 2a by crushing it as it passes between them.

The frame 3 of the machine includes two wheel-carrying legs 3a on which are mounted respective front wheels 5. The parts of the machine which lie rearwardly of the front legs 3a do not form part of the present invention and thus will not be described herein. They may be of known form.

The cutter platform 2 is mounted at the front of the frame 3 by a mounting system comprising two pairs of side arms, each pair consisting of an upper side arm 6 and a lower side arm 7. Each upper side arm 6 is pivoted at one end about an axis 8 to the frame 3 of the machine and extends forwardly and upwardly therefrom. At the upper end each upper side arm is pivoted about an axis 9 to the cutter platform 2. Each lower side arm 7 is pivoted at one end about an axis 10 to the frame 3 of the machine, and at the opposite end is pivoted about an axis 11 to the cutter platform. The lower side arms 7 are in fact constituted by respective double acting hydraulic actuators the extension or retraction of which controls the raising and lowering of the cutter platform 2 in a manner which will be described in greater detail below.

Above the upper side arms 6 are located two springs 12 each of which is connected at a forward end to a bracket 13 carried by the respective upper side arm 6, and at the rear end to a lug 14 carried on the frame 3 of the machine. Each of the springs 12 is connected to the respective lug 14 by means of a tie rod 15 of adjustable length, by means of which the spring tension can be adjusted.

Each of the upper side arms 6 is constituted by an arm assembly comprising a hollow cylindrical outer arm member 6a pivoted at its lower end by the pivot 8 to the frame 3 of the machine, and an inner arm member in the form of a stem 6b slidably mounted within the hollow cylindrical outer arm member 6a and projecting out therefrom at the end opposite the pivot 8; the end of the inner arm member 6b which projects out from the cylindrical body 6a is pivoted by the pivot 9 to the cutter platform 2. The hollow cylindrical outer arm member 6a is provided at its upper end with a collar 6c having a hole 6d. The inner arm member 6b is correspondingly provided with a row of holes 6e along its length. The position of the inner arm member 6b within the hollow cylindrical outer arm member 6a is fixed by means of a pin which is engaged in the hole 6d of the collar 6c and in one of the holes 6e of the inner arm member 6b; the length of the upper side arm 6 can then be adjusted to adapt the machine to different working conditions as will be described below.

The frame 3 of the machine is provided with two abutment elements 16 against which the upper side arms 6 are intended to engage in order to limit downward rotation of these arms from the position shown in FIG. 1. This occurs when the cutter platform 2 is to be raised from the ground (see FIG. 2), since extension of the hydraulic actuators 7 which constitute the lower side arms causes the upper side arms to turn in an anti-clockwise direction as viewed in the drawings.

Each of the two inner arm members 6b is provided, at the end thereof opposite the pivots 8, with an upwardly concave hook 17. The cutter platform 2 is correspondingly provided with two laterally extending transverse horizontal pins 18 which are received and supported rotatably in respective hooks 17. Two retaining members 19 are mounted one on each hook 17 to ensure that the pins 18 cannot inadvertently become disengaged from the hooks 17.

The cutter platform is also provided near the bottom with two lateral supports 20, each having a concave wall 20a in which is lodged a pin 7a carried at the end of the corresponding hydraulic actuator 7 remote from the frame 3 of the machine. Each of the pins 7a is retained on the respective support 20 by means of an L-shape retaining member 21 pivoted at one end about an axis 20b to the support 20 and displaceable about this pivot by means of a control lever 21a. Near the other end of the hydraulic actuator 7 there is a spring 22 connected at one end to the frame 3 and at the other end to the hydraulic actuator 7. Finally, the frame 3 is provided with selectively operable retaining means, which can be of any known type, (not shown) for retaining each of the two upper side arms 6 in position against the respective abutment elements 16 when desired.

The operation of the machine of the present invention is as follows:

The hydraulic actuators 7 are completely retracted when working in conditions of perfectly flat ground, and the cutter platform 2 then occupies the position shown in FIG. 1. As can be seen the upper side arms 6 are spaced from the abutment elements 16 in this position. When raising of the cutter platform 2 is to be effected the hydraulic actuators 7 are caused to extend. When this is done, the cutter platform 2 does not immediately start to rise with respect to the ground because, at first, the extension of the hydraulic actuators 7 causes a downward rotation of the upper side arms 6 about their pivots 8. This rotation continues until the upper side arms 6 meet the abutment elements 16. From this moment on further extension of the hydraulic actuators causes the rotation of the cutter platform 2 about the pivot axis 9 at which the support arms 6 are pivoted to the cutter platform 2. FIG. 2 illustrates the cutter platform in the raised position.

The cutter platform 2 is thus subjected to a preliminary forward displacement with respect to the frame 3 of the forage harvester machine before being raised with respect to the ground; this permits the above-mentioned advantageous increase in length of the conditioner rolls 4 to be obtained without risk of these fouling against the frame of the machine.

When the machine is in the lowered position with the hydraulic actuators 7 completely retracted, the tension in the springs 12 connected to the upper side arms 6 ensures that the cutter platform 2 does not bear with all its weight on the ground; the platform is in fact suspended so as to be able to move vertically with respect to the frame 3 of the machine, the arms 6 and 7 swinging about their respective pivots but remaining of fixed length. This is necessary in order that the platform can ride over any rigid bodies such as rocks or stones which it may encounter during use: likewise the platform can vary its vertical position to accommodate any unevenness in the ground. This avoids the possibility that the cutter platform might tend to penetrate into the ground with consequent undesirable accumulation of soil on the cutter bar. The suspension of the cutter platform also ensures that there is a greater load on the front wheels of the machine, which are usually driving wheels, in order to ensure the greatest possible adhesion for these wheels on the ground.

The relative positions of the pivots 8 and 9 of the upper side arms 6 and the lugs 14 to which the tie rods 15 are connected is chosen in such a way that the arms 6 are always in equilibrium, whatever their position, between the force exerted by the spring 12 and the force due to the weight of the cutter platform 2.

A further advantage of the present invention resides in the fact that the springs 12 are disposed above the support arms 6 and not at the sides of these, as was often the case in known machines, thus leaving the space between the wheel-carrying legs 3a of the machine free from obstruction.

The mounting system for the cutter platform described above has a number of advantages. For example it allows both the longitudinal and transverse position of the cutter platform to vary to adapt to irregularities of the ground. The length of the upper side arms 6 can be adjusted when desired to adjust the positioning of the cutter platform for proper working of the machine with different crops and on different terrain.

The particular conformation of the pivots of the lateral arms 6, 7 on the cutter platform 2 allows, moreover, the achievement of a rapid coupling or uncoupling of the cutter platform 2 to the side arms 6 and 7. In fact, to connect the ends of hydraulic actuators 7 to the supports 20 of the cutter platform 2 it is sufficient to cause the hydraulic actuators to extend until the pins 7a are carried into contact with the concave walls 20a of the supports 20. At this point it is possible, by turning the lever 21a, to lock each of the pins 7a in position with the L-shape retaining members 21. In order to couple the cutter platform 2 onto the ends of the upper arms 6 it is necessary first of all to lock the arms against the abutment elements 16 by means of the above mentioned retention means (not shown), thus preventing displacement of the arms 6 by the action of the springs 12. After the pins 18 have been lodged in the hooks 17 the retaining elements 19 are engaged in position. Preferably the hooks 17 are of rounded cross section so as to allow an inclination of the pins 18 with respect to a horizontal transverse axis; such inclinations occur, for example, when the position of the cutter platform adapts to the irregularities of the ground over which the machine is driven.

A secondary advantage of the structure described above lies in the fact that it is possible to use the double acting hydraulic actuators 7 for raising the front wheels of the machine. In order to do this it is necessary first to lock the upper side arms 6 onto the abutment elements 16 by means of the above mentioned retaining means. Then, with the cutter platform 2 resting on any suitable support or platform raised with respect to the ground, the hydraulic actuators 7 are controlled to retract thereby causing the raising of the front wheels 5 of the machine which thus remains in contact with the ground only by the rear wheels (not shown) and the cutter platform 2.

Having now described a particular embodiment of the invention, those skilled in the art will appreciate that many constructional and practical details may be widely varied with respect to what has been described and illustrated purely by way of example, without by this departing from the scope of the present invention as defined in the following claims.

What is claimed is:

1. In a machine for cutting and conditioning forage, of the type including:
   a frame,
   a cutter platform,
   a cutter bar mounted on said cutter platform,
   a pair of counter rotating transverse rolls on said cutter platform for conditioning the forage cut by said cutter bar,
   two pairs of side arms connecting said cutter platform to said frame of said machine, each said pair of side arms comprising an upper side arm and a lower side arm, and
   means pivoting each said side arm at one end thereof to said cutter platform and at the other end thereof to said frame of said machine,
   the improvement wherein:
   said upper side arms extend forwardly and upwardly from said pivot connecting them to said frame of said machine,
   said lower side arms each consist of a hydraulic actuator extension and retraction of which controls the raising and lowering of said cutter platform respectively,
   respective resilient biasing means are located above each said upper side arm, said resilient biasing means interconnecting the frame of said machine and said two upper side arms, and
   abutment elements located on the frame of said machine in positions such that said upper side arms are spaced therefrom when said hydraulic actuators are in a fully retracted position and said upper side arms turn downwardly about the pivots connecting them to the frame of said machine until they engage against said abutment elements when said double acting hydraulic actuators are caused to extend from said fully retracted position, whereby said cutter platform is displaced forwardly from its lowered position prior to being raised from the ground upon extension of said hydraulic actuators.

2. A machine for cutting and conditioning forage as in claim 1, wherein each of said upper side arms consists of:
   a hollow cylindrical outer arm member,
   means pivoting said hollow cylindrical outer arm member at one end thereof to said frame of said machine,
   an elongate inner arm member slidable within said hollow cylindrical outer arm member and having one end thereof projecting out from said hollow cylindrical outer arm member,
   means pivoting said one end of said inner arm member to said cutter platform, and
   adjustment means for adjusting the longitudinal position of said inner arm member within said hollow cylindrical outer arm member.

3. A machine as in claim 1, wherein said resilient biasing means comprises an elongate spring connected at one end to said frame of said machine by means of an adjustable tie rod.

4. A machine as in claim 1, wherein said one end of said upper side arms pivoted to said cutter platform are each provided with an upwardly concave hook and said cutter platform is provided with two horizontal transverse pins which engages in said hooks; a retention member being provided on each of said hooks for preventing disengagement of said horizontal pins therefrom.

5. A machine as in claim 1, wherein said one end of each said hydraulic actuator, which is pivoted to said cutter platform, is provided with a transverse pin,
   two lateral supports being provided at the lower part of said cutter platform, each said support having a concave wall in which are lodged said transverse pins of said hydraulic actuators;
   and retention means being provided on each of said lateral supports, for preventing disengagement of said transverse pins of said hydraulic actuators therefrom.

6. A machine as in claim 5, wherein said retention means comprise:
   an L-shape retention member having one limb pivoted to a respective said lateral support on said cutter platform and a free limb at the end thereof opposite said one limb, and
   a control lever rigidly connected to said L-shape retention member for manually turning said retention member about the pivot thereof to carry said free limb into facing relation with respect to said concave wall of the respective said lateral support.

7. A machine as in claim 1, wherein there are provided further resilient biasing means interconnecting said main frame of said machine and each said hydraulic actuator at a point adjacent said other end thereof which is pivoted to said main frame of said machine.

* * * * *